(12) United States Patent
Kang et al.

(10) Patent No.: US 11,781,205 B2
(45) Date of Patent: Oct. 10, 2023

(54) STRUCTURED AMORPHOUS METALS (SAM) FEEDSTOCK AND PRODUCTS THEREOF

(71) Applicant: Cornerstone Intellectual Property, LLC, Lake Forest, CA (US)

(72) Inventors: John Kang, Lake Forest, CA (US); Evelina Vogli, Lake Forest, CA (US)

(73) Assignee: LIQUIDMETAL COATINGS ENTERPRISES, LLC, Chattanooga, TN (US)

( * ) Notice: Subject to any disclaimer, the term of this patent is extended or adjusted under 35 U.S.C. 154(b) by 0 days.

(21) Appl. No.: 16/731,292

(22) Filed: Dec. 31, 2019

(65) Prior Publication Data
US 2021/0197259 A1    Jul. 1, 2021

(51) Int. Cl.
*C22C 45/02*    (2006.01)
*B22F 3/00*    (2021.01)
(Continued)

(52) U.S. Cl.
CPC ............... *C22C 45/02* (2013.01); *B22F 1/08* (2022.01); *B22F 3/006* (2013.01); *B22F 3/105* (2013.01);
(Continued)

(58) Field of Classification Search
CPC ..... C22C 1/002; C22C 1/0491; C22C 33/003; C22C 45/00; C22C 45/001; C22C 45/003;
(Continued)

(56) References Cited

U.S. PATENT DOCUMENTS

| | | | | |
|---|---|---|---|---|
| 4,473,401 A | * | 9/1984 | Masumoto | .............. C22C 45/02 |
| | | | | 148/403 |
| 2003/0062811 A1 | * | 4/2003 | Peker | ...................... H05K 5/02 |
| | | | | 312/223.1 |

(Continued)

FOREIGN PATENT DOCUMENTS

| | | | | | |
|---|---|---|---|---|---|
| CN | 106868496 A | * | 6/2017 | ............. | C22C 45/02 |
| CN | 107527702 A | * | 12/2017 | ............ | B22F 1/0003 |
| CN | 107794484 A | * | 3/2018 | ............. | C22C 45/02 |

OTHER PUBLICATIONS

Banu, Alexandra et al., "Microstructural Characterization of NiCrFeSiBC Coating During Long-Term Isothermal Oxidation at 850 C," J. Them. Spray Tech, 2019, 28, pp. 1275-1283. (Year: 2019).*

(Continued)

*Primary Examiner* — Vanessa T. Luk
(74) *Attorney, Agent, or Firm* — Dave Law Group LLC; Raj S. Dave

(57) ABSTRACT

Embodiments disclosed herein relate to the production of bulk amorphous metal (BAM) alloys comprising chromium, manganese, molybdenum, tungsten, silicon, carbon, boron, and the balance of iron to replace tungsten carbide-based welded material. The BAM alloy embodied herein can be applied through PTA welding, HVOF, TWAS, flame spraying, plasma spraying, laser, their combinations, and other coating and welding processes. When used as welded material, the density of the embodiment of around 7 grams per
(Continued)

CC, which is less dense than the tungsten carbide customarily used, resulting in even hard faces during welding spread uniformly across the weld, therefore creating a harder and more wear-resistant weld.

14 Claims, 3 Drawing Sheets

(51) Int. Cl.
    *B22F 5/12*     (2006.01)
    *B22F 3/105*     (2006.01)
    *C23C 28/02*     (2006.01)
    *B22F 1/08*     (2022.01)

(52) U.S. Cl.
    CPC .............. *B22F 5/12* (2013.01); *C23C 28/026* (2013.01); *B22F 2003/1051* (2013.01); *B22F 2301/058* (2013.01); *B22F 2301/35* (2013.01); *B22F 2303/30* (2013.01)

(58) Field of Classification Search
    CPC ... C22C 45/005; C22C 45/006; C22C 45/008; C22C 45/02; C22C 45/04; C22C 45/06; C22C 45/08; C22C 45/10; C22C 2200/02; C23C 28/026; C23C 28/046; C23C 28/323; C23C 28/343; B22F 3/006; B22F 9/002; B22F 9/004; B22F 9/005; B22F 9/007; B22F 2301/35; B22F 2301/355; B22F 2303/30

See application file for complete search history.

(56) References Cited

U.S. PATENT DOCUMENTS

| | | | |
|---|---|---|---|
| 2007/0029295 A1* | 2/2007 | Branagan | C22C 45/02 219/146.1 |
| 2010/0084052 A1* | 4/2010 | Farmer | C23C 28/324 427/591 |
| 2017/0159156 A1* | 6/2017 | Chou | C22C 33/003 |

OTHER PUBLICATIONS

Jwan Khalil Mohammed, Ramadhan H. Gardi, Dlair O. Ramadan, "Wear resistance of 304 austenitic stainless-steel friction welded joints," Journal of University Duhok, vol. 23, No. 1, Pure and Eng. Sciences, 2020, pp. 191-198. (Year: 2020).*

* cited by examiner

STRUCTURED AMORPHOUS METALS (SAM) FEEDSTOCK AND PRODUCTS THEREOF

TECHNICAL FIELD

The presently disclosed embodiments generally relate to applying bulk amorphous metals ("BAM") by plasma transfer arc ("PTA") welding and thermal spraying techniques; more particularly, BAM alloys, applied through PTA welding or thermal spraying, refer to iron-based alloys that are fully amorphous that may be welded using PTA to achieve crack-free welds, and may be intended to replace the industry-standard of tungsten carbide.

BACKGROUND

Compared to metallic alloy materials with a crystalline microstructure, "[i]t is widely known that metallic glasses are solid alloys [that] [exhibit] many superior properties", where "[t]he unique properties [of metallic glasses] originate from [their] random atomic arrangement . . . that contrasts with the regular atomic lattice arrangement found in crystalline alloys." [Source: "Classification of Bulk Metallic Glasses by Atomic Size Difference, Heat of Mixing and Period of Constituent Elements and Its Application to Characterization of the Main Alloying Element"; Takeuchi, A.; Inoue, A.; *Materials Transactions*, Vol. 46, No. 12 (2005) pp. 2817 to 2829].

And, "[t]he mechanical properties of amorphous alloys have proven both scientifically unique and of potential practical interest, although the underlying deformation physics of these materials remain less firmly established as compared with crystalline alloys." [Source: Mechanical behavior of amorphous alloys"; Schuh, C.; Hufnagel, T.; Ramamurty, U.; Acta Materialia 55 (2007) 4067 4109]. Further, "[t]he mechanics of metallic glasses have proven to be of fundamental scientific interest for their contrast with conventional crystalline metals, and also occupy a unique niche compared with other classes of engineering materials. For example, amorphous alloys generally exhibit elastic moduli on the same order as conventional engineering metals . . . but have room-temperature strengths significantly in excess of those of polycrystals with comparable composition. . . . The consequent promise of high strength with non-negligible toughness has inspired substantial research effort on the room-temperature properties of metallic glasses." [Source: Mechanical behavior of amorphous alloys"; Schuh, C.; Hufnagel, T.; Ramamurty, U.; Acta Materialia 55 (2007) 4067 4109].

Traditionally, to create an a hard-facing structure to increase wear resistance, tungsten carbide particles are applied to a coating using PTA welding [Source: "Overlay welding of NiSiB mixes with tungsten carbides"; Maroli, B.; Liu, C; APMA (2017) 1 4]. However, while this process improves the wear resistance of the alloys, tungsten carbide is denser than the surrounding matrix, causing the particles of tungsten carbide to settle at the bottom of the matrix, leaving the top area devoid of tungsten carbide particles and thus contributing to the creation of undesirable cracks that may compromise structural integrity. [Source: B. Maroli, C. Liu; "Overlay welding of Ni SiB mixes with tungsten carbides; APMA 2017, The 4$^{th}$ Intl. Conf. on Powder Metallurgy in Asia; Apr. 9-11, 2017, Hsinchu, Taiwan].

Accordingly, it would be desirable to develop an alloy suitable for welding-related application across a variety of industries that has a unique composition, properties, and physical structure to provide for superior performance when compared to the traditional industry standard of tungsten carbide, such that hard faces are distributed uniformly across the weld.

SUMMARY

An embodiment relates to a composition comprising an amorphous alloy that is free of tungsten carbide, the amorphous alloy having (i) a density that is less than that of the tungsten carbide and (ii) a wear resistance in ASTM G65 that is equal to or more than that of the tungsten carbide.

In an embodiment, the amorphous alloy has the density of less than 13 gm/cc.

In an embodiment, the amorphous alloy has the density of less than 10 gm/cc.

In an embodiment, the amorphous alloy has the density of in a range of about 7 gm/cc to about 8 gm/cc.

In an embodiment, the amorphous alloy has the density of around 7 gm/cc.

In an embodiment, the amorphous alloy comprises Fe, Cr, Mn, Mo, W, Si, C, and B.

An embodiment relates to a coating comprising a composition comprising an amorphous alloy that is free of tungsten carbide, the amorphous alloy having (i) a density that is less than that of the tungsten carbide and (ii) a wear resistance in ASTM G65 that is equal to or more than that of the tungsten carbide.

In an embodiment, the amorphous alloy has the density of less than 13 gm/cc.

In an embodiment, the amorphous alloy has the density of about 7 gm/cc to about 8 gm/cc.

In an embodiment, the amorphous alloy comprises Fe, Cr, Mn, Mo, W, Si, C, and B.

An embodiment relates to a powder feedstock comprising $Fe_{100-(a+b+c+d)}(Cr_a(Mn+Mo)_b(W+Si)_c(C+B)_d)$, wherein: a is in the range of 10 to 30 at. %, b is in the range of 10 to 20 at. %, c is in the range of 2 to 10 at. %, and d is in the range of 2 to 10 at. %, wherein the powder feedstock is free of tungsten carbide.

In an embodiment, in weight percent, B is greater than 0 to about 5, C is greater than 0 to about 2, Si is greater than 0 to about 2, Mn is greater than 0 to about 5, Mo is greater than 0 to about 20, W is greater than 0 to about 10, wherein B+C is about 2 to about 10, and wherein a ratio Mo/(Mn+W+Si) is about 1 to about 5.

An embodiment relates to a method comprising obtaining a powder feedstock comprising $Fe_{100-(a+b+c+d)}(Cr_a(Mn+Mo)_b(W+Si)_c(C+B)_d)$, wherein: a is in the range of 10 to 30 at. %, b is in the range of 10 to 20 at. %, c is in the range of 2 to 10 at. %, and d is in the range of 2 to 10 at. %, wherein the powder feedstock is free of tungsten carbide; performing a plasma transfer arc welding; and forming a weld.

An embodiment relates to a crack-free coating.

In an embodiment, the coating has a shrinkage less than 5%.

In an embodiment, the coating has a shrinkage less than 0.5% Presently disclosed embodiments relate to bulk amorphous metals ("BAM") based coatings, which refer to iron-based alloys that are fully or partially amorphous when provided as a feedstock, e.g., for subsequent welding. When welded using plasma transfer arc ("PTA") welding, the BAM alloys may be at least partially crystallized to create and spread relatively hard faces over an underlying amorphous-phase matrix. Accordingly, such BAM materials may be beneficial for coating surfaces requiring hard-facing, such as tools implemented in the oil and gas industry. BAM materials as disclosed herein may have a density of 7 to 8 grams per cubic centimeter and thus can be compared favorably to other industry standard materials used to create hard-facing, such as usage of tungsten carbide, where the density of tungsten carbide is considerably higher than the disclosed BAM materials at between 13 to 15 grams per cubic centimeter.

BAM alloys, as disclosed herein, form a stabilizing microstructural alloy on an applied-to surface and also features a lower density than convention tungsten carbide-based materials currently used to create hard-facing on welds and/or other regions.

BRIEF DESCRIPTION OF THE FIGURES

These and other features and advantages of the present invention will be better understood by reference to the following detailed description when considered in conjunction with the accompanying drawings wherein.

DETAILED DESCRIPTION

Definitions and General Techniques

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties, e.g., physical properties, then their crystalline counterparts. However, if the cooling rate is not sufficiently high, crystals may form inside the alloy during cooling, so that the unique benefits of the amorphous state can be lost. For example, one challenge with the fabrication of bulk amorphous alloy parts is the partial crystallization of parts due to either slow cooling or impurities prevalent in the raw alloy material. As a high degree of amorphicity (and, conversely, a low degree of crystallinity) is desirable in BMG parts, there is a need to develop methods for casting BMG parts having predictable and controlled amount of amorphicity.

Figure 1:
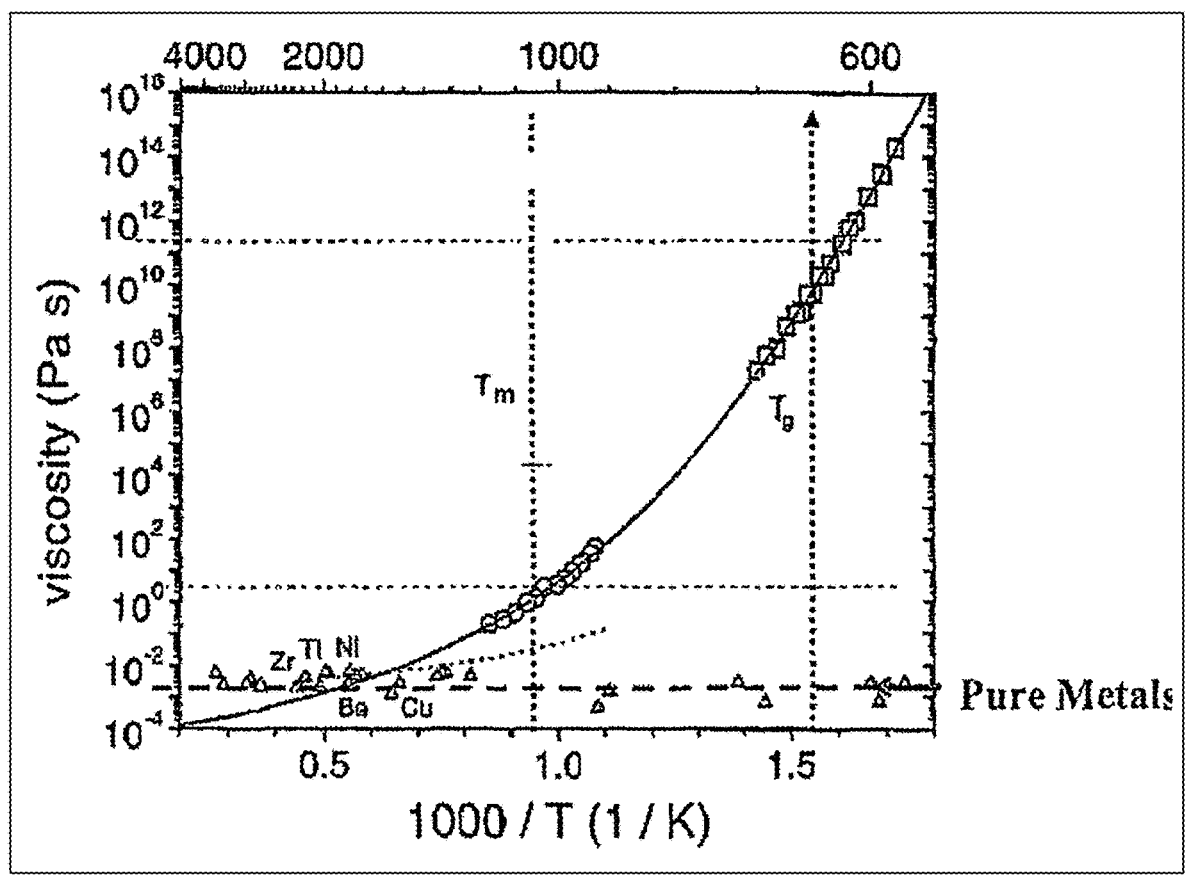
FIG. 1 shows a viscosity-temperature graph of a bulk solidifying amorphous alloy from the VIT-001 series of Zr—Ti—Ni—Cu—Be family.

FIG. 1 (obtained from U.S. Pat. No. 7,575,040) shows a viscosity-temperature graph of a bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
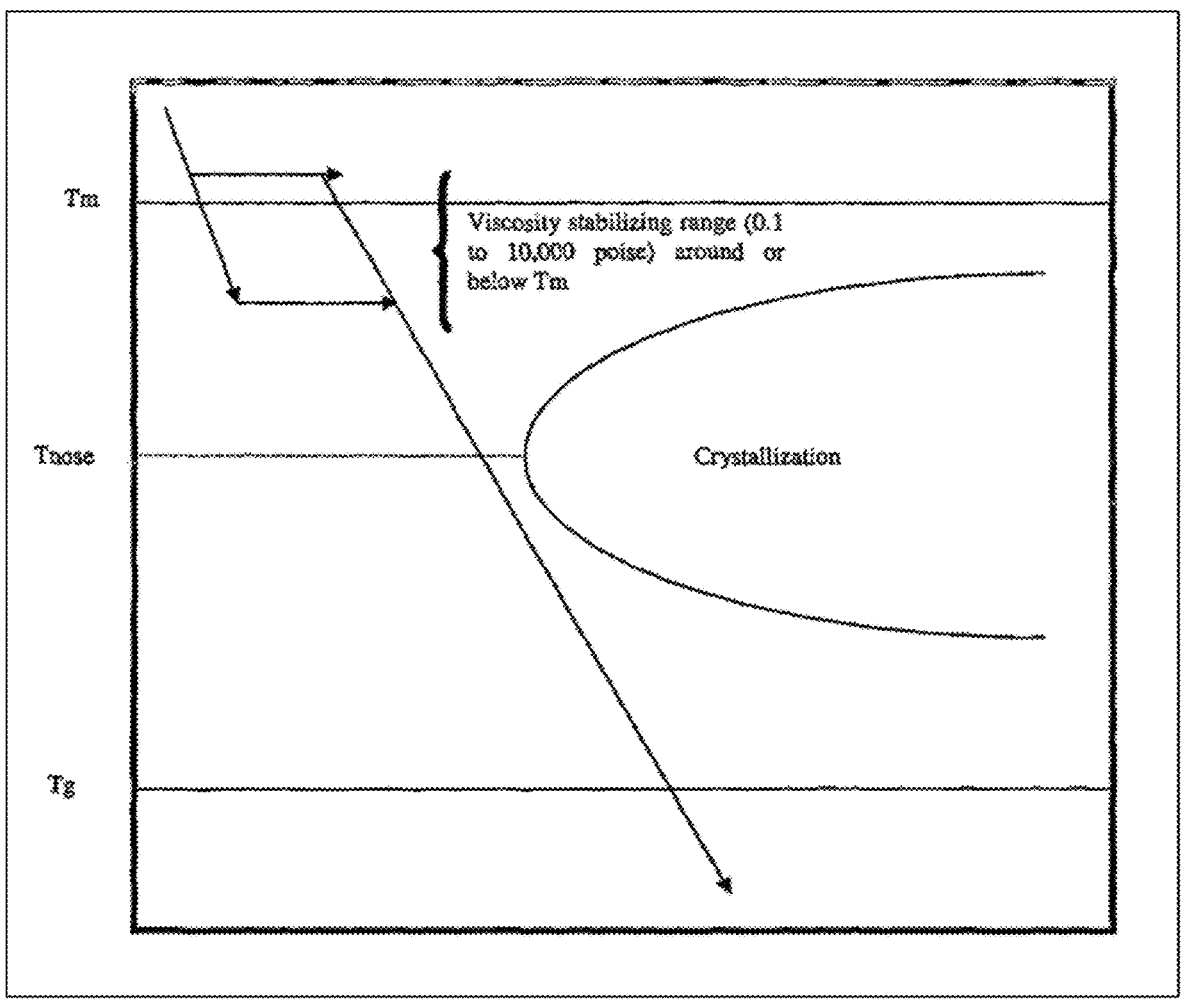
FIG. 2 shows a time-temperature-transformation (TTT) cooling curve of a bulk solidifying amorphous alloy.

FIG. 2 (obtained from U.S. Pat. No. 7,575,040) shows a time-temperature-transformation (TTT) cooling curve 200 of a bulk solidifying amorphous alloy, or TTT diagram. Bulk-solidifying amorphous metals do not experience a liquid/solid crystallization transformation upon cooling, as with conventional metals. Instead, the highly fluid, non-crystalline form of the metal found at high temperatures (near a "melting temperature" $T_m$) becomes more viscous as the temperature is reduced (near to the glass transition temperature $T_g$), eventually taking on the outward physical properties of a conventional solid.

Even though there is no liquid/crystallization transformation for a bulk solidifying amorphous metal, a "melting temperature" $T_m$ may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to be such that the time-temperature profile during cooling does not traverse through the nose-shaped region bounding the crystallized region in the TTT diagram of FIG. 2. In FIG. 2, $T_{nose}$ is the critical crystallization temperature $T_x$ where crystallization is most rapid and occurs in the shortest time scale.

The supercooled liquid region, the temperature region between $T_g$ and $T_x$ is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between 1012 Pa sat the glass transition temperature down to 105 Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about $T_x$. Technically, the nose-shaped curve shown in the TTT diagram describes $T_x$ as a function of temperature and time. Thus, regardless of the trajectory that one takes while heating or cooling a metal alloy, when one hits the TTT curve, one has reached $T_x$. In FIG. 2, $T_x$ is shown as a dashed line as $T_x$ can vary from close to $T_m$ to close to $T_g$.

The schematic TTT diagram of FIG. 2 shows processing methods of die casting from at or above $T_m$ to below $T_g$ without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below $T_g$ to below $T_m$ without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above $T_{nose}$ or below $T_{nose}$, up to about $T_m$. If one heats up a piece of amorphous alloy but manages to avoid hitting the TTT curve, you have heated "between $T_g$ and $T_m$", but one would have not reached $T_x$.

Typical differential scanning calorimeter (DSC) heating curves of bulk-solidifying amorphous alloys taken at a heating rate of 20 C/min describe, for the most part, a particular trajectory across the TTT data where one would likely see a $T_g$ at a certain temperature, a $T_x$ when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no $T_x$ upon heating. Another way to think about it is trajectories (2), (3) and (4) can fall anywhere in temperature between the nose of the TTT curve (and even above it) and the $T_g$ line, as long as it does not hit the crystallization curve. That just means that the horizontal plateau in trajectories might get much shorter as one increases the processing temperature.

Figure 3:
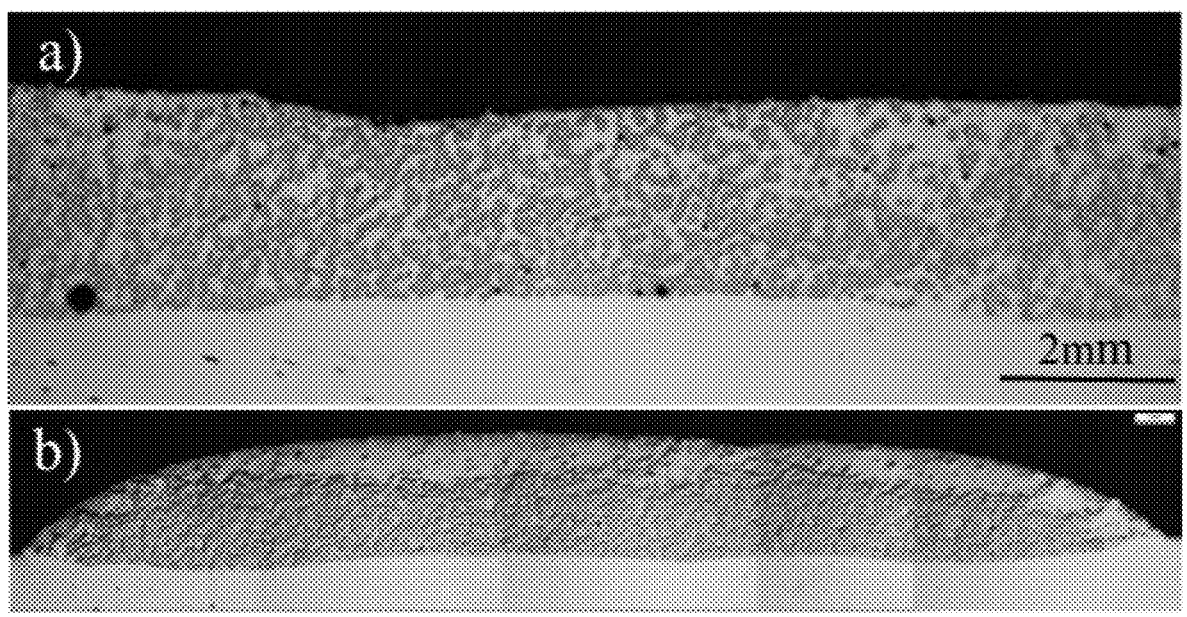
FIG. 3 shows PTA-welded dads using tungsten carbide (the industry standard used to create hard facing), where tungsten carbide particles sink to the bottom of the clad, creating uneven distribution. The micrographs show the distribution of the tungsten carbides in a) 1559-40 grade carbide power with 50 wt % 4590-type WC particle, laser cladded; b) 1559-40 grade carbide power with 50 wt % 4570-type WC particle welded as observed under a light optical microscope.

FIG. 3 shows PTA-welded dads using tungsten carbide (the industry standard used to create hard facing), where tungsten carbide particles sink to the bottom of the clad, creating uneven distribution. The micrographs show the distribution of the tungsten carbides in a) 1559-40+50 wt % 4590, laser cladded; b) 1559-40+50 wt % 4570 welded as observed under a light optical microscope.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, unununium, ununumium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about less than 1 micron, such as about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks long-range lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals presents in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via thermal spraying techniques such as a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt. %, such as at least about 40 wt. %, such as at least about 50 wt %, such as at least about 60 wt. %, such as at least about 80 wt. %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One embodiment of the described alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Amorphous Alloy Compositions

| Alloy | At. % | At. % | At. % | At. % | At. % | At. % | At. % | At. % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 5 | Pt | Cu | Ag | P | B | Si | | |
| | 74.70% | 1.50% | 0.30% | 18.0% | 4.00% | 1.50% | | |

TABLE 2

Additional Amorphous Alloy Compositions (Atomic %)

| Alloy | At. % | At. % | At. % | At. % | At. % | At. % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the composition $Fe_{48}Cr_{15}Mo_{14}Y_2C_{15}B_6$. They also include the alloy systems described by Fe—Cr—Mo—(Y, Ln)-C—B, Co—Cr—Mo-Ln-C—B, Fe—Mn—Cr—Mo—(Y, Ln)-C—B, (Fe, Cr, Co)—(Mo, Mn)—(C,B)—Y, Fe—(Co, Ni)—(Zr, Nb, Ta)—(Mo, W)—B, Fe—(Al, Ga)—(P, C, B, Si, Ge), Fe—(Co, Cr, Mo, Ga, Sb)—P—B—C, (Fe, Co)—B—Si—Nb alloys, and Fe—(Cr—Mo)—(C,B)—Tm, where $L_n$ denotes a lanthanide element and $T_m$ denotes a transition metal element. Furthermore, the amorphous alloy can also be one of the compositions $Fe_{80}P_{12.5}C_5B_{2.5}$, $Fe_{80}P_{11}C_5B_{2.5}Si_{1.5}$, $Fe_{74.5}Mo_{5.5}P_{12.5}C_5B_{2.5}$, $Fe_{74.5}Mo_{5.5}P_{11}C_5B_{2.5}Si_{1.5}$, $Fe_{70}Mo_5Ni_5P_{12.5}C_5B_{2.5}$, $Fe_{70}Mo_5Ni_5P_{11}C_5B_{2.5}Si_{1.5}$, $Fe_{68}Mo_5Ni_5Cr_2P_{12.5}C_5B_{2.5}$, and $Fe_{68}Mo_5Ni_5Cr_2P_{11}C_5B_{2.5}Si_{1.5}$, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and U.S. Pat. No. 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One composition is Fe72A15Ga2P11C6B4. Another example is Fe72A17Zr10Mo5W2B15. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. An example of such a practice would be that of adding tungsten carbide particles to an amorphous alloy in order to increase the alloy's hardness while maintaining ductility. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between $T_g$ and $T_x$, for example. Herein, $T_x$ and $T_g$ are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Amorphous Alloy Manufacturing

Amorphous alloys and bulk amorphous alloys may currently be manufactured by two primary techniques: (1) solidification; and (2) consolidation. Solidification techniques encompass the following: listed arc melting, splat quench, metal injection molding, jet casting, twin-roll casting, die casting, copper mold casting, suction casting and high pressure die casting (HPDC). Consolidation techniques include: hot pressing, warm extrusion, explosive compaction and spark plasma sintering. However, the discussed techniques or processes severely limit manufacturing net-shape components relying upon amorphous metal feedstock.

There have been only a few reports on fabrication of bulk Iron-based alloys using casting. This method has been used because of excellent dimensional accuracy of the finished or final product, smooth cast surfaces as-cast that eliminates or reduces post-machining operations and rapid production rates, among other advantages. Casting includes melting the amorphous alloys and melt injection thereafter into a mold. The molten amorphous alloys injected into the mold are then pressed under a relatively high pressure either mechanically or hydraulically while under a controlled atmosphere. Such conditions allow for the pushing of the molten amorphous alloys into desired mold cavities and complex recessions to produce correspondingly complex shapes with a high degree of accuracy and a fully dense structure. Such die casting as described of amorphous materials is further discussed in various U.S. Patents including U.S. Pat. Nos. 6,021,840 and 6,070,643, both of which are incorporated herein by reference in their respective entireties. In a report, an Fe-based alloy has been cast with an inner diameter of 6 mm and an outer diameter of 10 mm. A reason for the selection of such dimensions is that the Fe-based bulk amorphous alloys may be very brittle. Hence, they are only limited to manufacturing in a laboratory scale and cannot withstand a large scale or volume industrial casting process.

Another technology to manufacture Iron-based bulk metallic alloys is powder metallurgy (PM), a process that includes: pulverization, compaction and sintering. Solid state sintering includes: isostatic pressing, hot isostatic pressing (HIP), shock consolidation, electric current assisted sintering, such as spark plasma sintering, etc. However, this technology involves hot pressing and/or sintering which could deteriorate some of most important properties of the Fe-based bulk metallic alloys including: amorphic state, mechanical properties, and magnetic properties, among others.

Relatively low viscosity at the melting temperature will provide fast and complete filling of intricate portions of a shell/mold with a bulk solidifying amorphous metal for forming the amorphous metallic alloy parts. Engel Global, of Schwertberg, Austria, has developed an injection molding machine capable of processing amorphous metallic alloys. During operation, the amorphous alloy blanks are automatically fed into a melting chamber where the blanks are then melted inductively under high vacuum conditions. The molten metal alloy is injected into a thermo-regulated mold through a piston. Very rapid cooling under exclusion of oxygen leads to the forming of the amorphous structure. The process may be completed in a timeframe that is significantly shorter than PM processes while also including high surface quality as finish with minimal or no need for CNC processing. However, this process does have limitations regarding the maximum size of each part able to be fabricated, as well as regarding the specific dimensions of the parts. For instance, wall thickness of parts produced by the process may vary between 1 and 4 mm and part weight up to 80 g. (P. Hauck: Liquidmetal and Metal Injection Molding: Two complementary metal forming technologies, Powder Injection Molding International 8[3] (2014) 53-61).

High Pressure Die Casting (HPDC) is a much faster technique, compared to other casting techniques, and also offers a high dimensional accuracy and productivity. Ramasamy et al. (P. Ramasamy, A. Szabo, S. Borzel, J. Eckert, M. Stoica, A. Bárdos: High pressure die casting of Fe-based metallic glass, Scientific Reports 6, 2016) studied the effect of HPDC process parameters on microstructural evolution, thermal and magnetic properties of a Fe-based amorphous alloy. They concluded that the quality of the samples is strongly influenced by die material, amorphous alloy temperature during casting and flow rate of the amorphous alloy. Even complex geometries with high dimensional accuracy could be achieved, but undesirable porosity and cracking during solidification limited this method to manufacture amorphous metallic alloy parts.

The viscosity of amorphous alloys at the melting temperature lie in the range of about 0.01 poise to about 10,000 poise, and bulk solidifying alloy can exist as a highly viscous liquid between the melting and glass transition temperature. The process-ability of amorphous alloys in the supercooled liquid region is similar to plastics with strain rates of the order of 0.01 s-1. Hence, Thermoplastic Forming (TPF) has also been used for manufacture Fe-based bulk amorphous alloys. However, a short processing time to avoid crystallization is a major disadvantage of this technology for manufacturing large and complex parts. Further, geometric constraints exist as imposed by reducing the sample size or feature below a critical length scale of 1 mm. Nevertheless, this technology offers near-net shape geometry parts, very good surface finish and the ability to manufacture fine and small complex structures.

While amorphous materials offer great promise for different applications, it is difficult to achieve their benefits because of the problems encountered in preparing parts based on the amorphous metallic alloys. However, such problems may be largely avoided by using amorphous alloys in coating related technologies to realize the benefits of the alloys. In such an application, the amorphous alloys are applied as a coating on a surface of a metallic part. Indeed, because of limitations in application thickness, metallic glasses were initially largely limited to applications that involved coatings. Technologies to apply such coatings include: thermal spraying techniques (plasma spraying, arc spraying, high velocity oxygen fuel and high velocity Air Fuel), Physical Vapor Deposition (PVD), electrodeposition, etc. For example, in some thermal spraying techniques, metallic glass in a powdered form of micrometer sized particles is sprayed onto the object to be coated. In other thermal spraying techniques, metallic glass in a wire form is heated to a molten state and thereby applied to the object to be coated. The thermal sprayed coatings are usually rough and require a grinding finishing step to achieve the dimensional accuracy. Thinner coating could be achieved through PVD technique. However, this technique is limited insofar the part size is constrained from the PVD chamber size. In addition, as with all coatings applied as protective layers, if a thin amorphous coating is worn away in a location of the part exposed to particularly severe conditions, the parts may not be protected anymore by the thin amorphous coating. In addition, a localized coating cracking or worn out can grow in lateral extent rapidly, so that adjacent portions of the coating are undermined and the coating flakes away. There is then a very rapid increase in the rate of damage, so that failure of a part thought to be protected can occur catastrophically.

Additive Manufacturing (3D Printing)

Amorphous alloys and bulk amorphous alloys may be used as a feedstock material for advanced manufacturing techniques such as additive manufacturing, an industrial production technology that has developed from advances in 3D printing regarding precision, repeatability and material range. Additive manufacturing, generally, refers to a transformative approach to traditional industrial production that enables the fabrication of parts demonstrating desirable physical properties, including improvements in strength and weight reduction when compared to parts made through conventional manufacturing.

3D printing refers to any one or more of the various processes in which material may be joined, glued, adhered, or otherwise solidified under computer control to create a 3D object, with source/feedstock material being added together (e.g., liquid molecules, or powder grains being fused together), typically in a layer-by-layer manner. Objects printed by 3D printing can now have a very complex shape or geometry and typically are produced based on a digital 3D model or a computer-aided-design (CAD) file.

Although there are several 3D printing processes, all 3D printing processes or production techniques can generally be categorized into the following seven categories: (1) vat photopolymerization; (2) material jetting; (3) binder jetting; (4) powder bed fusion; (5) material extrusion; (6) directed energy deposition; and (7) sheet lamination. Also, fused deposition modeling (FDM) has gained prominence regarding the fabrication of metal parts in the 3D printing industry. In FDM, material is added layer-by-layer, instead of conventional machining which may require material to be removed from an item, or traditional casting and forging processes.

General principles governing additive manufacturing or 3D printing may include the following: (1) modeling; (2) printing; (3) finishing; as well as: (4) multi-material printing. Regarding modeling, 3D printable models may be created with the aid of a CAD package through a 3D scanner, or by a digital camera used with photogrammetry software. Printing often involves a layer-by-layer deposition of material according to computer-aided direction, e.g., building the material in the upward vertical direction after the deposition of an initial base or foundation layer to form a completed item or part. Complex geometries and hollowed-out interior surfaces are feasible with modern methods. Finishing refers to the process of achieving greater accuracy than possible by 3D printing alone by printing a slightly oversized version of the desired object to later remove excess material using a higher-resolution subtractive process. Multi-material printing allows for objects to be composed of complex and heterogenous arrangements of source materials, and may require specific materials being directed to specific voxels, e.g., referring to each of an array of elements of volume that constitute a notional three-dimensional space, inside the object volume.

Hardfacing Applications

"Hardfacing is the application of hard, wear-resistant material to the surface of a component by welding, thermal spraying, or a similar process, mainly to reduce wear. Hardfacing is used on original equipment as well as for the repair of worn components. Hardfacing consumable materials are acceptable in different forms, such as powder, solid welding rods or wires, and tubular rods or wires." [Source: "Production of Nickel and Nickel-Alloy Powders"; Oleg D. Neikov, . . . Irina B. Murashova, in Handbook of Non-Ferrous Metal Powders (Second Edition), 2019].

Hardfacing, describing generally instances where harder or tougher material is welded to a base metal, creates a harder, more wear-resistant surface. Traditionally, alloy materials having high carbide contents, such as tungsten carbide, provide higher wear, heat, and corrosion resistance, making such materials desirable for application and usages in industries with demanding environments, such as the oil and gas industry. Without appropriate distribution of hardfaces throughout a weld, weaknesses can be created within a clad that can contribute to the creation and propagation of fractures, weakening both the weld and the base metal underneath [Source: "Influence of the Hard Facing Welds Structure on their Wear Resistance"; Balog, P.; Brezinova, J.; Draganovska, D.; Guzanova, A.; Vinas, J.; *Metals* 36, https://doi org/10.3390/met6020036].

Iron-based metal matrices and tungsten carbides are commonly used for hardfacing of components requiring resistance to abrasive wear. These coatings may be used in the oil and gas industry in many different contexts, such as associated with rock bits and drilling stabilizers. However, tungsten carbide is typically denser than the matrix it is carried in, resulting in welds that have a heavy amount of tungsten carbide on or near the bottom closer to the substrate, while the top area has few to no particles of tungsten carbide. This lack of consistent distribution of tungsten carbide material throughout the weld results in cracks, weakening the coating [Source: B. Maroli, C. Liu; "Overlay welding of NiSiB mixes with tungsten carbides; APMA 2017, The 4$^{th}$ Intl. Conf. on Powder Metallurgy in Asia; Apr. 9-11, 2017, Hsinchu, Taiwan].

Accordingly, it would be desirable to develop a bulk amorphous metal (BAM) alloy less dense than tungsten carbide and suitable for producing hardfacing for applied-to surfaces applied, where such hardfacing would not otherwise be achievable by other industry standard materials, e.g., such that deposited BAM alloy is initially fully amorphous and crystallizes uniformly throughout the weld, creating uniform hard faces.

Generic Description of the Embodiments

Amorphous metals are a new class of metal alloy-based materials that have a disordered, non-crystalline, and glassy structure. Amorphous metals may be created when metals or their alloys are: (1) cooled very quickly; or (2) have a unique composition that allows for the bypass of crystallization during solidification of the material. Rapid cooling of metals may be achieved upon exposure or application of metals to a supercooled liquid to reduce the temperature of the metals beneath the melting temperature $T_m$, and by exposure of the metals to an appropriate cooling rate to permit the metals in liquid phase to solidify with an amorphous structure.

The preparation of new amorphous metallic alloys that form amorphous structure below the glass transition temperature at a rate between 100 to 1,000 K/sec are described in U.S. Pat. No. 9,499,891. Earlier, glassy ingots with 5 mm diameter were produced from an alloy having a composition of 55% palladium, 22.5% lead, and 22.5% antimony, by using surface etching followed with several heating-cooling cycles. More recently, new alloys have been developed that form an amorphous structure at cooling rates as slow as 1 K/sec. These amorphous alloys can be cast into parts of up to several centimeters in thickness depending on the type of alloy used while continuing to retain an amorphous structure. Optimal glass-forming alloys may be based at least in part on zirconium and palladium, but alloys based on iron, titanium, copper, magnesium, and other metals are also known. These alloys have a high temperature difference between the glass transition temperature and the crystallization temperature. Some of the alloys have a difference between glass transition and crystallization of about less than 70 degrees, thus resulting in limitations encountered during manufacturing of these alloys.

Regardless of challenges associated with their formation, amorphous metals are often desirable in a number of applications due to their unique microstructure, which combines ultra-high strength, high hardness and ductility. They are also more corrosion resistant relative to conventional metals due to the lack of long-range periodicity, related grain boundaries and crystal defects such as dislocations down to the atomic scale. Moreover, they may be stronger than crystalline metals and can sustain larger reversible deformations than crystalline alloys. However, bulk consolidation of these amorphous powders is crucial to maintain amorphous structure.

Various representative amorphous coatings, formulations, and methods of manufacture thereof are disclosed in the following: U.S. Pat. Pub. No.: 2009/0087677 entitled "Amorphous Aluminum Alloy Coatings" directed to an amorphous aluminum alloy coating, which may include one of cerium, cobalt and/or molybdenum as alloying elements and be applied by a physical vapor deposition process to a desired thickness. The coating may supply improved corrosion resistance to a given environmental condition. A method is provided for forming an amorphous aluminum alloy coating involving: providing a vacuum chamber; providing a substrate for coating; providing a target material comprising aluminum and one or more alloying elements; and, for ejecting particles from said target and depositing an amorphous aluminum alloy coating wherein at least 50% of said alloy is amorphous.

U.S. Pat. Pub. No.: 2014/0345754 entitled "Molding and Separating of Bulk-Solidifying Amorphous Alloys and Composite Containing Amorphous Alloys" directed to a method to form and to separate bulk solidifying amorphous alloy or composite containing amorphous alloy. The forming and separating takes place at a temperature around the glass transition temperature or within the super cooled liquid region are provided. The method involves: processing a metal alloy to form a bulk solidifying amorphous alloy part, wherein the processing is performed in a manner such that a time-temperature profile during the processing does not traverse through a region bounding a crystalline region in a time-temperature-transformation (TTT) diagram of the metal alloy, and cutting a portion of the bulk solidifying amorphous alloy part by a cutting tool that is heated to a temperature greater than a glass transition temperature ($T_g$) of the metal alloy without previously cooling the bulk solidifying amorphous alloy part to a temperature near room temperature.

U.S. Pat. Pub. No.: 2014/0193662 entitled "Stainless Steel-and-Amorphous Alloy Composite and Method for Manufacturing" directed to a stainless steel-and-amorphous alloy composite includes a stainless-steel part and an amorphous alloy part. The stainless-steel part has nano-pores defined in a surface thereof. The amorphous alloy part is integrally bonded to the surface having the nano-pores. A method for manufacturing the composite is also described.

U.S. Pat. Pub. No.: 2016/0177430 entitled "Z-Group Amorphous Alloy Composition" directed to a highly corrosion-resistant Zr-group amorphous alloy composition. According to one, provided is the Zr-group amorphous alloy composition comprising: 67-78 atomic percent of Zr; 4-13 atomic percent of Al and/or Co; 15-24 atomic percent of Cu and/or Ni, wherein glass forming ability of the Zr-group amorphous alloy composition is at least 0.5 mm. The disclosed Zr-group amorphous alloy composition provides a highly corrosion-resistant Zr-group amorphous alloy composition containing a higher Zr content compared to existing amorphous alloys, and has only commercial metal elements, and therefore has superior industrial and economic utility and is easily rendered practical.

Although amorphous materials offer great promise for various applications, difficulties currently exist regarding extracting their full benefit because of challenges encountered in preparing amorphous metallic alloy parts. However, such drawbacks can be overcome through the production of bulk amorphous alloys by using additive manufacturing (AM). AM processes are typically designed to manufacture parts with high dimensional accuracy and quality. A number of scientists have reported AM of amorphous alloys. For instance, U.S. Pat. No. 8,333,922 discusses a method of producing three-dimensional bodies, which wholly or for selected parts consist of a composite of crystalline or nanocrystalline metal particles in a matrix of amorphous metal. Alloys described in this patent are titanium-based, zirconium-based and copper-based alloys. In addition, iron-based alloys including Fe—Ga—(Cr,Mo)—(P,C,B), Fe—C-Ln-B, Fe—B—Si—Nb, Fe—Ga—(P,B), Fe—(Al,Ga)—(P,C,B,Si,Ge) are also included.

Currently, manufactured crystalline and amorphous alloys have used tungsten carbide (WC) particles in order to create hard facing and improve wear resistance. Using laser cladding and PTA welding, WC particles can be added to a matrix and then cooled in order to be embedded in the coating. When tested for abrasive wear, the samples containing WC had less volume loss than the samples without WC [Source: "Overlay welding of NiSiB mixes with tungsten carbides"; Maroli, B.; Liu, C; APMA (2017) 1 4]. WC has an average density of 15.6 g/cm$^3$; therefore, if used in amorphous alloys, the alloy risks being not dense enough to support the WC particles and the particles settle towards the bottom of the coating, increasing the risk of cracking.

A proposed solution according to embodiments herein is to use bulk amorphous alloys (hereafter referred to as BAM alloys) composed of iron, chromium, manganese, molybdenum, tungsten, silicon, carbon, and boron as a replacement for traditional WC-based welding materials. The BAM alloy has a density of about 7 g/cm$^3$, which is substantially less dense than WC particles and can be used to create hard faces uniformly throughout the weld, instead of a high amount of hardfacing toward the bottom of the weld.

The amorphous material may be used for manufacturing. The amorphous metallic material may be deposited to produce multifunctional parts with ultra-high strength, without sacrificing toughness, to show wear resistance on account of the even distribution of hard facing produced by the lower density. The amorphous material may be deposited using welding techniques such as plasma transfer arc (PTA) welding or thermal spraying techniques.

EMBODIMENTS

Amorphous Metals—Generally

Of the type of materials discussed above regarding potential application and usage in hardfacing, metals, and more specifically amorphous metals, possess unique physical properties making their usage in hardfacing particularly desirable. Generally, an amorphous metal is a solid metallic material, often an alloy, having a disordered atomic-scale structure. While many metals are crystalline in their solid state (e.g., indicating a highly-ordered arrangements of atoms), amorphous metals are non-crystalline and have a glass-like structure. However, unlike common glasses, which are typically electrical insulators, amorphous metals have good electrical conductivity. Amorphous metals may be produced by several methods, including the following: extremely rapid cooling, physical vapor deposition ("PVD"), solid-state reaction, iron irradiation, and mechanical alloying. [Source: "Connectivity and glass transition in disordered oxide systems"; Ojovan, M. I.; Lee, W. B. E. (2010); Journal of Non-Crystalline Solids. 356 (44-49): 2534.]

Earlier, small batches of amorphous metals have been produced via a variety of rapid cooling methods, including sputtering molten metal onto a spinning metal disk (referred to as "melt spinning"). The rapid cooling, on the order of millions of degrees C. per second, is too fast for crystallization to occur and the material is "locked" or "frozen" into a glassy state. Recently, alloys with critical cooling rates low enough to permit formation of amorphous structure in thicker layers (e.g., over 1 millimeter) have been made; these are referred to as bulk metallic glasses ("BMG").
Physical Properties of Amorphous Metals Used in Manufacturing Amorphous metal is typically an alloy, rather than a pure metal (defined herein as not being joined with any other metal or synthetic metal). Alloys, defined herein as a metal made by combining two or more metallic elements (to give greater strength or resistance to corrosion) contain atoms of significantly different size that leads to reduced free volume, and thus considerably higher viscosity than other metals and alloys, in a molten state. The increased viscosity of molten amorphous metal prevents its atoms from moving around enough to create an ordered lattice. Also, the material structure of an amorphous metal also results in reduced shrinkage during cooling, and resistance to plastic deformation. The absence of grain boundaries (defined herein as the interface between two grains, or crystallites, in a polycrystalline material; grain boundaries are 2D defects in a crystal structure and tend to decrease the electrical and thermal conductivity of the material), the weak areas of crystalline materials, provides improved resistance to wear and corrosion. [Source: "Microhardness and abrasive wear resistance of metallic glasses and nanostructured composite materials"; Gloriant, Thierry (2003); Journal of Non-Crystalline Solids. 316 (1): 96-103]. In addition, due to the absence of a phase transition, the solidification shrinkage, typically around 5% in crystalline metals, is less than 0.5% in amorphous materials. Also, amorphous metals, while classified as being glasses, are also considerably tougher and less brittle than oxide-based glasses and ceramics. And, "[t]hermal conductivity of amorphous materials is lower than that of crystalline metal. As formation of amorphous structure relies on fast cooling, this limits the maximum achievable thickness of amorphous structures." [Source: https://en.wikipedia.org/wiki/Amorphous metal; Retrieved on Apr. 23, 2019].

It is known that alloy chemistry influences, and potentially determines, density and toughness of materials. It has been demonstrated that aluminum-based alloys may have a lower density with the addition of lithium and zirconium without sacrificing toughness, whereas aluminum-based alloys had a lower density with the addition of lithium, beryllium, boron, and magnesium but lacked the toughness the aforementioned composition possessed. [Source: E. P. Pat. No. 0158769A]. Depending on what is required for the task, alloys can be tailored to what is needed through choosing the proper chemical composition, i.e. selecting an alloy with a specific density to perform a specific task.

It has been demonstrated that alloys with lower density than that of WC particles will result in WC particles sinking to the bottom of the clad and therefore be dispersed unevenly, resulting in uneven properties in the final product. This results in less wear resistance, producing a weaker coating [Source: B. Maroli, C. Liu; "Overlay welding of NiSiB mixes with tungsten carbides; APMA 2017, The 4th Intl. Conf. on Powder Metallurgy in Asia; Apr. 9-11, 2017, Hsinchu, Taiwan].

Embodiments relate to BAM alloys as a feedstock for manufacturing metal alloy parts. An embodiment relates to a BAM alloy that is an iron-based alloy and is fully amorphous. In an embodiment, when the BAM alloy is welded using PTA, the BAM alloy gets crystallized. In an embodiment, when the BAM alloy is welded using PTA, the BAM alloy is crystallized to form a hard face spread over an amorphous matrix. An embodiment relates to a product made from the BAM alloys by PTA welding.

Based on testing the product made from the BAM alloys that were PTA welded in different ways, and compared these products with tungsten carbide based welded materials, which are standard for different application in oil and gas, the inventors were able to get the same wear resistance as that of a product made from a tungsten carbide containing alloy having about 60 to 65 percent tungsten carbide in the tungsten carbide containing alloy.

However, the product made the BAM alloy has a density of around 7 grams per cc compared to the product made from the tungsten carbide containing alloy, which as a density between 13 and 15 grams per cc depending on the amount of tungsten carbide in the tungsten carbide containing alloy.

In addition, since BAM creates a hard face during welding, the hard face is spread uniformly on the weld from the bottom to the top of the weld. While in the case of tungsten carbide, usually since tungsten carbide is heavier than the matrix, tungsten carbide settles down. So the weld has a lot of tungsten carbide at the bottom of the weld next to the substrate, while the top of the weld is just matrix.

So for a tungsten carbide weld, the weld is allowed to abrade in the beginning to remove the tungsten carbide free matrix, and then the wear protection starts. While in the case of the material of the embodiments herein, the material exhibits wear resistance since the beginning of wear of the weld as the material is uniformly hard from the bottom to the top.

Embodiments further relate to making weld using a tungsten carbide-free powder feedstock, instead of wires, for PTA welding to create crack-free welds with BAM alloy. In the prior art, when the material formed by welding too hard, there cracks are created because of the hard faces, and one cannot build up on the weld surface. On the other hand, with the BAM alloy of the embodiments herein, as the weld is crack-free, one creates a hard face by welding, the weld is uniformly hard throughout, and one can build up on the weld surface. In an embodiment, there is provided an amorphous alloy comprising $Fe_{100-(a+b+c+d)}(Cr_a(Mn+Mo)_b(W+Si)_c(C+B)_d)$, wherein a, b, c, and d represent atomic percentages. "a" is in the range of 10 to 30 at. %, "b" is in the range of 10 to 20 at. %, "c" is in the range of 2 to 10 at. %, and "d" is in the range of 2 to 10 at. %.

An embodiment relates to an BAM alloy coating composition comprising iron, chromium, manganese, molybdenum, tungsten, silicon, carbon, and boron in specific predetermined ratios and/or quantities. The composition has a density of 7 to 8 grams per cubic centimeter and thus can be compared favorably to tungsten carbide based materials that are to create hard faces.

In an embodiment, a disclosed composition is: $Fe_{100-(a+b+c+d)}(Cr_a(Mn+Mo)_b(W+Si)_c(C+B)_d$ where: a is in the range of 10 to 30 at. %; b is in the range of 10 to 20 at. %; c is in the range of 2 to 10 at. %; and, d is in the range of 2 to 10 at. %.

In some embodiments, BAM based coatings can comprise, in weight percent ("wt. %"): B from about 0 to about 5, C from about 0 to about 2, Si from about 0 to about 2, Mn from about 0 to about 5, "Mo" is about 0 to about 20, "W" is about 0 to about 10, wherein "C+B" is about 2 to about 10, and wherein the ratio "Mo/(Mn+W+Si) is about 5 to 3, 2 to about 1, or is about 1 to about 2. The composition has a balance of iron.

The content of the elements in the alloy composition can vary. With respect to the element chromium, the alloy composition can comprise about 10 wt. %, such as at least about 15 wt. %, such as at least about 20 wt. %, such as at least about 25 wt. %, such as at least about 30 wt. %, of Cr.

With respect to the element molybdenum, the alloy composition can comprise at least about 5 wt. %, such as at least about 10 wt. %, such as at least about 15 wt. %, such as such as at least about 20 wt. %, of Mo.

With respect to the element manganese, the alloy composition can comprise at least about 1 wt. %, such as at least about 2 wt. %, such as at least about 3 wt. %, such as such as at least about 4 wt. %, such as such as at least about 5 wt. %, of Mn.

With respect to the element tungsten, the alloy composition can comprise at least about 2 wt. %, such as at least about 4 wt. %, such as at least about 6 wt. %, such as such as at least about 8 wt. %, such as such as at least about 10 wt. %, of W.

With respect to the element carbon, the alloy composition can comprise at least about 0.5 wt. %, such as at least about 1 wt. %, such as at least about 2 wt. %, such as such as at least about 3 wt. %, of C. In one embodiment, the element C can be present in the form of a carbide.

With respect to the element boron, the alloy composition can comprise at least about 1 wt. %, such as at least about 2 wt. %, such as at least about 3 wt. %, such as such as at least about 4 wt. %, such as at least about 5 wt. %, of B. In one embodiment, the element B can be present in the form of a boride.

With respect to the element silicon, the alloy composition can comprise at least about 0.5 wt. %, such as at least about 1 wt. %, such as at least about 2 wt. %, such as such as at least about 3 wt. %, such as at least about 4 wt. %, of Si. In one embodiment, the element Si can be present in the form of a silicide.

In some embodiments, the BAM alloy coating can be fully amorphous.

In some embodiments, the BAM alloy coating can be nanocrystalline, as defined by having a grain size of 100 nm or less.

In some embodiments, the BAM alloy coatings can be partially amorphous or partially nanocrystalline. For example, the BAM alloy coating can have at least 50% of its volume being amorphous, such as at least 60%, such as at least 90%, such as at least 95%, such as at least 99%, the balance being nanocrystalline.

In some embodiments, the thickness of the BAM alloy coating can be from about 0.001" to about 0.3", such as about 0.005" to about 0.08", and such as from about 0.020" to about 0.050", such as from 0.015" to about 0.03", such as from about 0.02" to about 0.025.

In some embodiments, the BAM alloy coating is applied via methods including but not limited to those using a wire feedstock including but not limited to metal inert gas (MIG) welding, tungsten inert gas (TIG) welding, arc welding, submerged arc welding, open arc welding, bulk welding, laser cladding, and other welding processes as well as those using a powder feedstock including but not limited to laser cladding and plasma transferred arc welding.

In some embodiments, the BAM alloy coating is applied via thermal sprayed methods including but not limited to those using a wire feedstock including but not limited to twin wire arc spraying (TWAS), laser spraying, and other thermal spraying processes as well as those using a powder feedstock including but not limited to Flame Spraying, High Velocity Oxygen Fuel (HVOF), Atmospheric Plasma Spraying (APS), Vacuum Plasma Spraying (VPS), Cold Spraying, etc.

In one embodiment, the alloy composition is not alloyed, at least partially alloyed, such as at least mostly alloyed, such as at least fully alloyed. Powder feedstock can either be a single homogenous alloy or a combination of multiple alloy powders which result in the desired chemistry when melted together. Wire feedstock can be in the form of a metal core wire, solid wire, or flux core wire.

In some embodiments, the BAM alloy coating can comprise a Vickers hardness of at least 800 (or at least about 800), such as about 1,000 or above (or about 1000 or above), such as 1,200 or above (or about 1,200 or above), such as 1,400 or above (or about 1,400 or above).

In some embodiments, the BAM alloy coating can comprise an adhesion strength of at least 5,000 psi (or at least about 5,000 psi), such as at least 7,500 psi (or at least about 7,500 psi), such as at least 10,000 psi (or at least about 10,000 psi), such as at least 12,000 psi (or at least about 12,000 psi).

In some embodiments, the abrasion resistance of the BAM alloy coating as measured via ASTM G65 testing can be 1 gram loss or below (or about 1 grams loss or below), such as 0.8 grams loss or below (or about 0.8 grams loss or below), such as 0.6 grams loss or below (or about 0.6 grams loss or below), such as 0.4 grams loss or below (or about 0.4 grams loss or below).

In some embodiments, the density of the BA alloy coating is about 7 to 8 grams per cubic centimeter.

In some embodiments, the BAM alloy coating/weld is crack-free due to no minimal shrinkage of the amorphous structures.

The aforementioned embodiment may be applied via the twin wire arc spray, HVOF, flame spraying, plasma spraying, laser, plasma transfer arc (PTA), their combinations, and/or other coating and welding processes. Welding processes are included but not limited to those using a wire feedstock, including but not limited to metal inert gas (MIG) welding, tungsten inert gas (TIG) welding, arc welding, submerged arc welding, open arc welding, bulk welding, laser cladding, and other welding processes as well as those using a powder feedstock including but not limited to laser cladding and plasma transferred arc welding.

In another embodiment, one or more of the disclosed compositions may be: not alloyed, at least partially alloyed, at least mostly alloyed, or fully alloyed. Powder feedstock may either be a single homogenous alloy or a combination of multiple alloy powders which result in the desired chemistry when melted together. Wire feedstock can be in the form of a metal core wire, solid wire, or flux core wire.

Advantages

Advantages of the disclosed embodiments include providing a fully amorphous metallic alloy composition that has a relatively lower density than conventional welding materials such as tungsten carbide, therefore producing hardfacing evenly throughout the layer, e.g., as the lower density results in uniform mixing throughout deposited and/or welded layers, unlike usage of heavier such as tungsten carbide ("WC") materials that typically sink toward the bottom of the weld, etc. Moreover, disclosed compositions provide for superior welds without sacrificing its amorphous qualities. The disclosed BAM alloy has a density of about 7 to 8 g/cc, while WC-based welds and coatings range from 13 and 15 g/cc. When welded using PTA, the disclosed BAM alloys become at least partially crystalline, with hardfaces spread out over an amorphous matrix. This results in a more wear-resistant, hard surface while still being amorphous and retaining the associated qualities. The disclosed embodiments also avoid the risk of having an uneven distribution of hard faces, as alloys with WC particles do, which increases the risk of cracking.

The disclosed BAM alloys also benefit from the random organization nature of amorphous metallic alloys generally, which makes such alloys, including BAM alloys, free from the typical defects associated with crystalline structures, such as dislocations and grain boundaries. This disordered, dense atomic arrangement and the absence of crystal slip systems determines the unique structural and functional properties of amorphous alloys. Thus, amorphous metals are more wear resistant compared to conventional metals due to the lack of long-range periodicity, related grain boundaries and crystal defects such as dislocations. In addition, they are stronger than crystalline metals and they can sustain larger reversible deformations than crystalline alloys. Due to their unique microstructure, amorphous metals combine ultra-high strength, high hardness and ductility in one single material.

As presented and discussed earlier, amorphous metal alloys can be tailored to fit specific needs while still retaining the benefits of their amorphous structures, including adapting the composition to result in a lower density. As indicated by evaluating the disclosed composition, the density of the alloy can be lowered, resulting in uniform hardfacing, which in turn results in superior hardness and wear resistance.

EXAMPLES

Example 1

Two embodiments (hereafter referred to as New Alloy #1 and New Alloy #2) tested against seven other welded materials for wear resistance in ASTM G65 (dry sand/rubber wheel abrasion apparatus) wear test:

| Material | Weight Loss [mg] |
|---|---|
| NiCrFeSiBC + 60% WC | 85 |
| New Alloy #1 (Fe71.5 Cr11 Mn1.5 Mo9 W4 Si1 C1 B1) | 85 |

-continued

| Material | Weight Loss [mg] |
|---|---|
| New Alloy #2 (Fe55 Cr16 Mn2 Mo16 W6.5 Si1 C1.5 B2) | 55 |
| Nanostructured FeCrMoMnNbSiBC #1 | 120 |
| Nanostructured FeCrMoMnNbSiBC #2 | 110 |
| Amorphous FeCrWTiNbBC #1 | 115 |
| Amorphous FeCrWTiNbBC #2 | 125 |
| Fe-2C25Cr | 190 |
| Plain Steel | 255 |

All references, including granted patents and patent application publications, referred herein are incorporated herein by reference in their entirety.

Accordingly, the foregoing description should not be read as pertaining only to the precise structures described and illustrated in the accompanying drawings, but rather should be read consistent with and as support to the accompanying drawings, but rather should be read consistent with and as support to the following claims which are to have their fullest and fair scope.

What is claimed:

1. A composition comprising an amorphous alloy free of tungsten carbide, the amorphous alloy having (i) a density that is less than that of the tungsten carbide and (ii) a wear resistance in ASTM G65 that is equal to or more than that of a material consisting of NiCrFeSiBC and 60 wt. % WC;

wherein the amorphous alloy comprises:

$Fe_{100-(a+b+c+d)}(Cr_a(Mn+Mo)_b(W+Si)_c(C+B)_d)$ wherein: a is in the range of 10 at. % to 16 at. %; b is in the range of 10 at. % to 20 at. %; c is in the range of 2 at. % to 10 at. %; and d is in the range of 2 at. % to 3.5 at. %.

2. The composition of claim 1, wherein the amorphous alloy has the density of less than 13 gm/cc.

3. The composition of claim 1, wherein the amorphous alloy has the density of less than 10 gm/cc.

4. The composition of claim 1, wherein the amorphous alloy has the density a range of about 7 gm/cc to about 8 gm/cc.

5. The composition of claim 1, wherein the amorphous alloy has the density of around 7 gm/cc.

6. The composition of claim 1, wherein the amorphous alloy comprises:

$Fe_{71.5} Cr_{11} Mn_{1.5} Mo_9 W_4 Si_1 C_1 B_1$ in at. %.

7. The composition of claim 1, wherein the amorphous alloy comprises: $Fe_{55} Cr_{16} Mn_2 Mo_{16} W_{6.5} Si_1 C_{1.5} B_2$ in at. %.

8. A coating comprising the composition of claim 1.

9. The coating of claim 8, wherein the amorphous alloy has the density of less than 13 gm/cc.

10. The coating of claim 8, wherein the amorphous alloy has the density of about 7 gm/cc to about 8 gm/cc.

11. The coating of the claim 8, wherein the coating is crack-free.

12. The coating of the claim 8, wherein the coating has a shrinkage less than 5%.

13. The coating of the claim 8, wherein the coating has a shrinkage less than 0.5%.

14. The coating of claim 8, wherein the ratio Mo/(Mn+W+Si) is about 1 to 2 by weight percent.

* * * * *